QUANTUM MECHANICAL TUNNEL INJECTION AMPLIFYING APPARATUS

Filed April 10, 1963 3 Sheets-Sheet 1

INVENTOR.
JOHN G. SIMMONS

BY Carl Fissell Jr.
AGENT

INVENTOR.
JOHN G. SIMMONS

BY *Carl Fissell Jr.*
AGENT

QUANTUM MECHANICAL TUNNEL INJECTION AMPLIFYING APPARATUS

Filed April 10, 1963

INVENTOR.
JOHN G. SIMMONS

BY Carl Fissell Jr.
AGENT

United States Patent Office 3,267,389
Patented August 16, 1966

3,267,389
QUANTUM MECHANICAL TUNNEL INJECTION AMPLIFYING APPARATUS

John G. Simmons, Norristown, Pa., assignor to Burroughs Corporation, Detroit, Mich., a corporation of Michigan
Filed Apr. 10, 1963, Ser. No. 271,944
4 Claims. (Cl. 330—37)

This invention relates to solid state electron apparatus and, more particularly, although not necessarily exclusively, to solid state electron apparatus of the type utilizing the quantum mechanical electric tunnel effect for causing electron transfer and/or migration within and through solid state apparatus to effect amplification.

Space charged limited current thin film semi-conductor "transistors" have been operated as amplifiers, AND gates, NOR gates, etc. However, such devices for the most part are temperature sensitive to a relatively high degree and also are relatively low in frequency response thereby limiting their general usefulness and operational capability. Additionally, such devices are thermionic in character and as such rely on electron emission similar to that of the conventional vacuum tube. At low temperatures electrons do not have sufficient energy to scale the potential barrier within such devices thus further limiting the operational capability thereof. Furthermore, surface states and traps, so called, in the base forming materials make repetitive fabrication relatively difficult thus measurably limiting and/or lessening production quality.

It is therefore an important object of the present invention to provide solid state electron apparatus which overcomes these and other problems in a novel and unusual manner.

Another object of the invention is to provide a multilayer solid state electron apparatus wherein the injecting and receiving members of the device are extremely closely spaced together effectively reducing the resistance therebetween to a negligible value permitting higher electron tunnel injection.

A still further object of the invention is to provide a solid state electron device having an extremely high amplification factor.

It is also an object of the invention to provide a solid state electron thin film amplifying device utilizing the tunnel injection effect.

Still another object of the invention is to provide a solid state electron device which effectively overcomes any surface states and/or traps in the materials from which the apparatus is fabricated.

In accordance with the foregoing objects and first briefly described, the present invention comprises a first conductive member active as a source of electrons disposed closely adjacent to a second conducting member active as a receiving drain for said electrons and being separated from said source by a distance of a few thousand angstroms. A conductive control or gate member is disposed intermediate between the source and drain members and separated therefrom by an insulating member in a manner effective upon the application of a potential difference between said source and said drain to induce a conductive channel between said source and drain thereby enabling electrons to tunnel therebetween and whereby a potential difference between said source and said gate is effective to modulate said conductivity channel thus to produce an appreciable amplification of the output.

Additional objects and features characterizing the present invention are set forth more particularly in the appended claims. The invention itself both as to its organization and method of operation, as well as additional objects and advantages thereof will be best understood from the description in the specification which follows when read in conjunction with the accompanying drawings and appended claims wherein:

Figure 1:
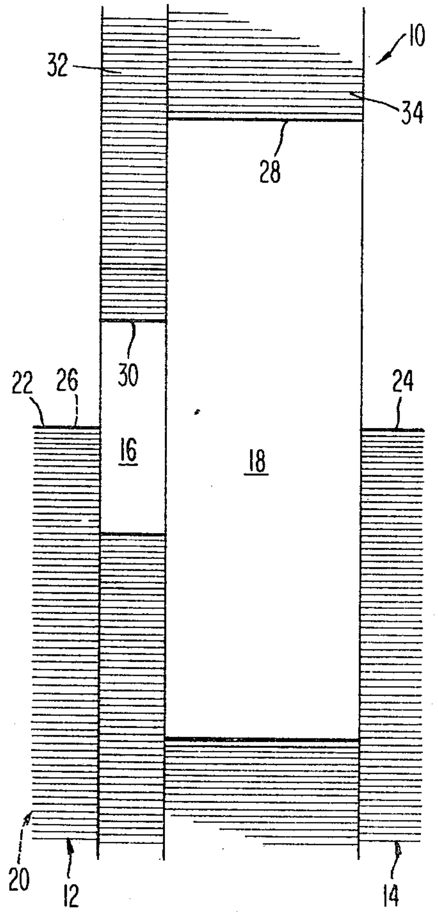
FIG. 1 is an energy level diagram of a solid state electron device in accordance with the present invention illustrated in equilibrium condition.

Thin film transistors can be likened to their three element semi-conductor transistor counterparts except that whereas the semi-conductor transistor employs an emitter, a collector and a base electrode for its operation, the corresponding active elements of the thin film device have been characterized as the source, the drain and the gate respectively. A thin film transistor employing intrinsic cadmium sulphide to which ohmic contacts are made by source and drain electrodes acts in the nature of a semi-insulator such that space charge limited current can flow in the insulator under suitable bias conditions.

If a positive potential or bias is placed between the source and gate thereby creating a field therebetween, the conduction band of the cadmium sulphide is distorted such that the portion in contact with the blocking insulator falls below the Fermi level of the source material thereby producing what is characterized as an induced conductivity channel between the blocking insulator, adjacent to the gate and the semi-insulator material into which electrons can be made to move. The greater the applied bias the deeper will be the channel and hence the more conductive the channel becomes. A drain electrode adjacent the source electrode forms the third element of the combination and produces a sort of electrical loop from the source through the conductive channel back to the drain. By modulating the gate with a predetermined signal the conductivity channel is effectively modulated and hence the flow of electrons between the source and drain is modulated. In this manner amplification can be quite readily accomplished.

Such devices have certain inherent limitations as the result of the semi-conductor material employed therewith. Traps, or what might be characterized as energy bands that are capable of trapping electrons as they pass from the source to the conducting channel, are inherent in such structures as these. This measurably reduces the flow of electrons in the device. Also, since the device is thermionic, at low temperatures, the electrons do not have sufficient energy to scale the band gap of the semi-insulator material so as to get into the conductive channel. Thus the device is temperature dependent or sensitive and becomes inoperative at very low temperatures. Additionally, this type of apparatus relies upon surface states of the material for its operational characteristics. Such surface states are difficult if not impossible to control in production, this makes the device very difficult to reproduce in quantity. Finally, in order to reduce the resistance between the source and drain electrodes, these two elements must be positioned very close together. Proximities to within one micron have been achieved. Even closer spacing is obviously desirable since the closer the two electrodes are together, the less chance there is of electrons being trapped as they transfer from one electrode to the other via the conductive channel.

Since traps and surface states, etc., are inherent problems with the semi-conducting device, it has been experimentally demonstrated that a novel mechanism for overcoming these problems and limitations is to employ quantum mechanical tunneling so that the surface states and traps are ineffective to prevent the transfer of electrons from one electrode to the other via a conducting channel.

Referring first to FIG. 1 of the drawings, which is illustrative of the equilibrium condition for a device constructed in accordance with the teaching of the present invention, there is seen an energy level diagram for a solid state electron apparatus 10, comprising a first or source electrode 12, of conducting material, such for example, as beryllium or aluminum, separated from a second or gate electrode 14 also of aluminum or beryllium, by a tunnel insulator 16, i.e., a very thin insulating material through which electrons can pass by the mechanism of quantum mechanical tunneling, the tunnel insulator being disposed adjacent and contiguous to a blocking insulator 18. As will appear more clearly hereinafter, with reference to FIG. 3, a drain electrode 20 is located in the same plane as the source electrode 12, i.e., superposed thereon, and thus cannot readily be seen in FIG. 1.

Figures 3, 4:
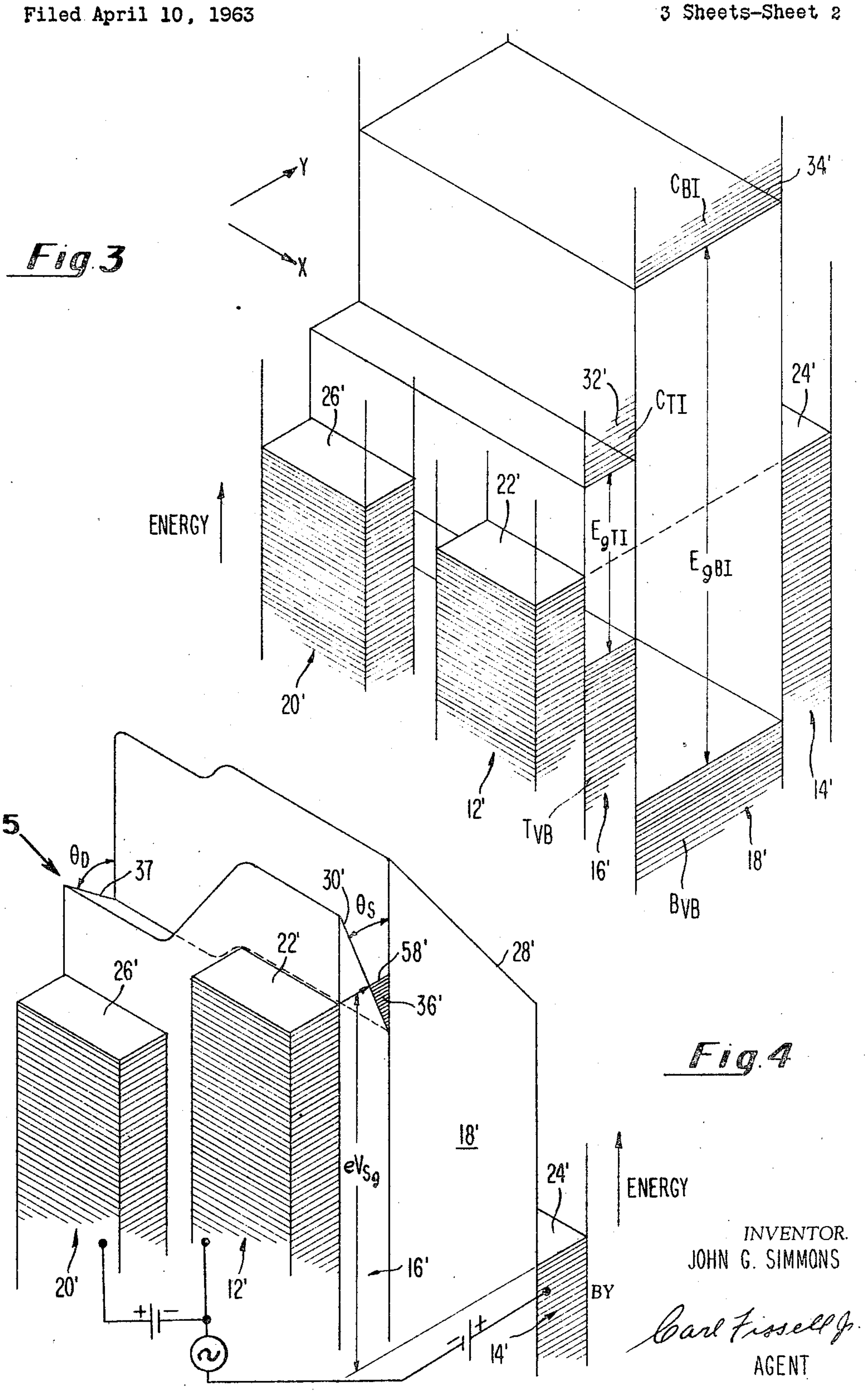
FIG. 3 is a three dimensional illustration of an energy level diagram for the condition of the invention illustrated in FIG. 1.
FIG. 4 is a three dimensional illustration of an energy level diagram illustrating the condition for the apparatus illustrated in the energy level diagram of FIG. 2.

It is noted in this connection that FIGS. 3 and 4 while having the general appearance of solid figures, are actually intended to be two dimensional drawings—having only length and breadth—the vertical or height dimension is the "energy" dimension, as shown.

The device of the present invention can be characterized as a tunnel emitter. The source electrode is chosen of aluminum or beryllium since both metals are capable of producing self-limiting oxides thereon, thereby providing the tunnel insulator 16 through which the electrons can be made to move or migrate. Preferably the source electrode 12 is beryllium because beryllium does not age as aluminum does. In any event, a self-limiting oxide is or may be grown to an extent sufficient to permit the electrons to tunnel through it. Thereafter, the blocking insulator 18 may be fabricated as by evaporating upon the first insulator an additional oxide layer such for example as silicon monoxide. The second insulator is made to be considerably thicker than the tunnel insulator 16, as for example, in a ratio of approximately 10 to 1. The Fermi levels 22 and 24 of the source and gate electrodes 12 and 14, respectively, are at the same height. The Fermi level 26 of the drain 20 is superposed upon the Fermi level of the source 12. Ideally, it is desirable that the potential barrier 28 of the blocking insulator 18 be greater, i.e., higher than the potential barrier 30 of the tunnel insulator 16. The shaded area 32 represents the conduction band of the tunnel insulator 16 while the shaded area 34 is the conduction band of the blocking insulator 18.

As shown in FIG. 3, 12' is the source electrode, 14' is the gate electrode and 20' is the drain electrode. Reference characters 22', 24' and 26' represent the respective Fermi levels of each of these electrodes all three of which are shown in alignment or coincidence (dotted horizontal line between source and gate). The tunnel insulator is 16' while the blocking insulator is 18'. $Eg_{TI}$ represents the energy gap of the tunnel insulator 16' while $Eg_{BI}$ is the energy gap of the blocking insulator 18'. As before mentioned, the tunnel insulator 16' may be the grown oxide of the metal source electrode 12' or it may be a deposited oxide. The blocking insulator 18' is silicon monoxide in this instance. The shaded areas $T_{VB}$ and $B_{VB}$ are the valence bands of the tunnel and blocking insulators 16' and 18', respectively.

The probability of the electrons having sufficient thermal energy to scale these energy gaps at room temperature is negligible and thus conduction on this level is highly improbable. $C_{TI}$ and $C_{BI}$ represent the conduction bands of the tunnel and blocking insulators 16' and 18', respectively. The shaded areas below the Fermi levels of each of the electrodes 12 and 14 and 20 are the filled energy levels of each electrode. As seen the empty levels of the insulators are above the Fermi levels of the electrodes so that, since at room temperature it is highly improbable for electrons to "jump up" they are obliged to "tunnel through" the insulator via the tunnel injection principle as hereinafter described.

Figure 2:
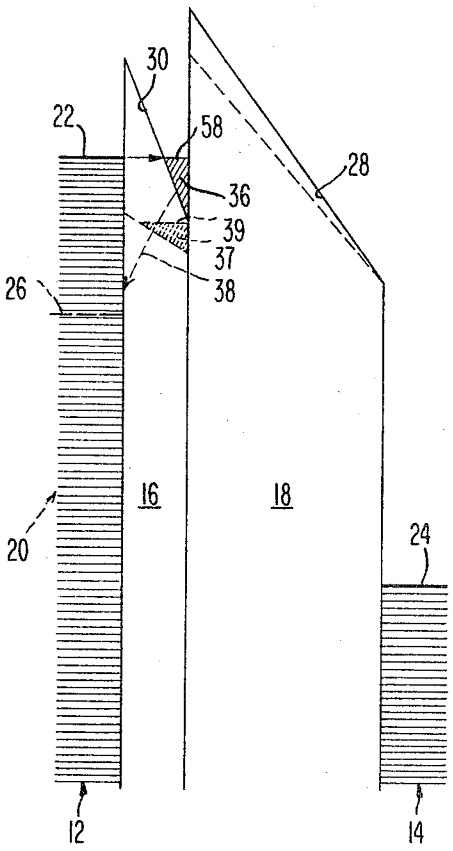
FIG. 2 is an energy level diagram of a solid state electron apparatus of the present invention with a potential bias applied thereto.

Turning now to FIG. 2 of the drawings, if a potential is placed between the source and gate electrodes 12 and 14 respectively (gate positive relative to source) an electrical field is developed within both insulators 16 and 18 which depends upon the dielectric constant of the materials of the insulator. As seen in this figure, the slope of the bottom of the conduction bands 28 and 30 indicates the size of this field. The electrical field distorts the bottom of the conduction bands to an extent that the right hand edge of the conduction band of the tunnel insulator 16 is depressed below the Fermi level 22 of the source electrode 12 thereby creating a conductive channel 36 between the two insulators. Electrons may now tunnel from the source electrode 12 through the tunnel insulator 16 and flow along the conductive channel 36 and then tunnel back (dotted line 38) into the drain electrode 20, the Fermi level 26 of which, as shown in dotted outline, is now displaced a considerable distance below the Fermi level 22 of the source electrode 12. As will appear more fully hereinafter, the conductivity of the conductive channel 36 thus may be modulated by varying the voltage between the source and gate. It is known that the tunnelling current is independent of temperature or very much so, making the present device substantially thermally independent. Also, such apparatus is capable of much higher speeds of operation, since the electrons have a much shorter path to traverse to get to the induced conductivity channel (less than 100 angstroms). Additionally, the device is not dependent on surface states and/or traps and thus avoids the problems inherent in the semi-insulator type of apparatus.

FIG. 4 represents the bias conditions just previously described, and as with FIG. 3, is a three deminsional "solid." It being of course understood that the vertical dimension is energy. With an applied potential or bias $V_{sg}$, the conduction bands of the insulators 16' and 18' shift or distort as the Fermi levels of the source and gate electrodes are displaced in height relative to one another by an amount $eV_{sg}$ on the energy scale, where $e$ is the unit of electronic charge. The slope of the lines indicating the bottom level of the conduction bands in the tunnel and blocking insulator represent the field on these members. This action produces the induced conductivity channel 36' (the angle $\theta_s$) between the source and the gate electrodes 12' and 14'. Likewise an induced conductivity channel 37' (the angle $\theta_d$) is formed between the drain and gate electrodes 14' and 20': the two channels are interconnected as shown by the dotted line in FIG. 4. Application of a potential or bias between the source and the drain lowers the drain with respect to the source on the energy scale by an amount equivalent to $eV_{sd}$ where $V_{sd}$ is the voltage between the source and drain which also lowers channel 37' relative to channel 36' but not necessarily by the amount $eV_{sd}$.

Figure 5:
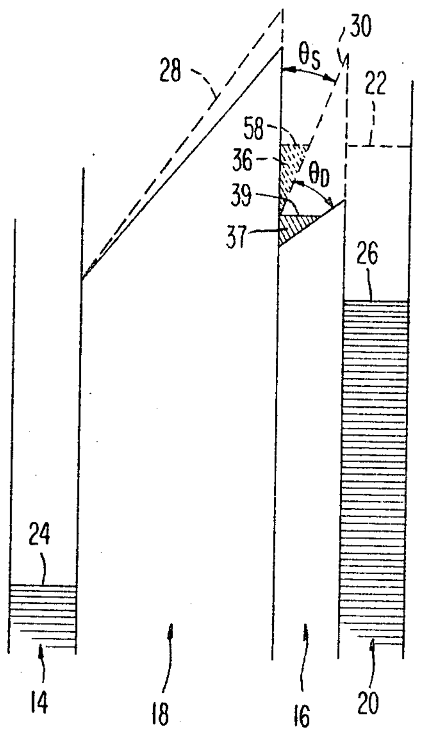
FIG. 5 is a view in the direction of the arrow 5 in FIG. 4.

As illustrated most clearly in FIGURE 5 the apex of the angle $\theta_d$ at the drain is seen to be somewhat lower than the apex of the single $\theta_s$ at the source so that the level of the electrons i.e., the Fermi level 39' of the drain channel 37' is at all times above the Fermi level 26' of the drain itself. Electrons now are obliged to flow "down" the energy "hill or slope" from the source channel 36' to the drain channel 37' and hence from the drain channel back into the drain itself. In recapitulation it is seen therefore that the application of a voltage between the source and drain lowers the Fermi level of the drain with respect to the Fermi level of the source. However, no current can flow if there is no bias between the source and gate since the device is effectively two conductors separated by an insulator and there is no mechanism permitting electrons to flow between them. That is, there is no conductive channel since the conduction bands can be inclined only by the application of a gate bias. The application of a potential bias between the source and the gate supplies the mechanism for electron transfer and thus for current generation by creating the induced conductive channels at the source and drain. Electrons can tunnel from the source into the source channel thence flow into the drain channel and tunnel back into the drain. Electrons are constantly resupplied from the source so long as the gate bias conditions persist.

It can now be seen that by increasing the bias between the source and gate the size of the conductive channels are effectively increased and hence the resistance between source and drain is decreased. This increases the conduction between the source and drain. Thus, if a signal is introduced between the source and the gate the conductivity therebetween can be effectively modulated as will now be described.

FIG. 5 is an energy level diagram illustrating the conditions existing between source and gate in FIG. 4, the view being taken in the direction of the arrow 5 in FIG. 4.

Figure 6:
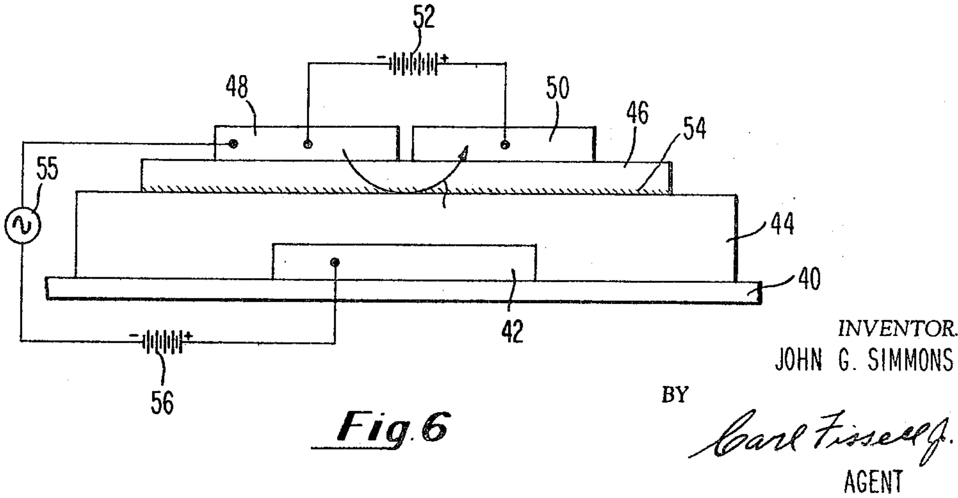
FIG. 6 is a schematic diagram of apparatus embodying the present invention including means for applying electrical potentials thereto.

One form of apparatus constructed in accordance with the teaching of the present invention is set forth schematically in FIG. 6 of the drawing. A rigid smooth planar substrate 40, e.g., glass microscope slide, has evaporated thereon a conductive gate electrode 42 over which a relatively thick oxide layer 44 is either grown as an oxide of the metal electrode 42 or deposited thereon. This forms the blocking insulator, so called. A second oxide layer 46 thin enough to permit electron penetration by quantum mechanical tunnelling is disposed on the first layer 44. Thereafter source and drain electrodes 48 and 50 are evaporatively layed down in an adjacent parallel spaced apart configuration as shown. By suitable choice of apertured masks and by judicious mechanically positioning of the latter over the layer of insulation 46, exceptionally close spacing between source and drain 48 and 50 can be obtained effectively reducing the resistance between these two elements and measurably increasing the output thereby. Apparatus fabricated as hereinabove described could theoretically position the source 48 adjacent to the drain 50 by no more than one or two thousand angstroms. Source-drain potential bias may be supplied by means of a battery 52 with the source negative relative to the drain. A source-gate potential supplied by battery 56 acts to form the conductive channel 54 at the interface of the two insulators 44 and 46 enabling electron migration from source to drain via the conductive channel 54. Application of a signal potential from source 55 between source and gate superposed upon the potential from battery 56 modulates the current flow from the source through the conductive channel to the drain.

Figure 7:
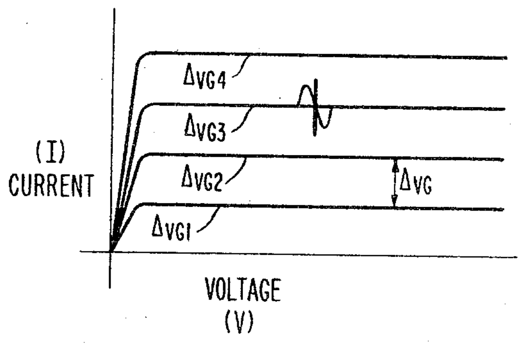
FIG. 7 is a graph illustrating the I–V characteristics of the device of FIG. 6; and, FIGS. 8 and 9 are schematic representations of apparatus fabricated in accordance with the teachings of the present invention.

The predicted and expected I–V characteristics for such a device are set forth in FIG. 7. The voltage is plotted against the current between the source and the drain. Without a gate voltage applied there is essentially infinite impedance. Application of a gate voltage $\Delta V_g$ to the device produces a current output as shown, which rises very sharply and then levels off to a plateau. Varying the voltage from $\Delta V_{g1}$–$\Delta V_{g4}$ produces an incremental increase in output current so that if the gate potential is now modulated the device is capable of amplifying in much the same manner as a pentode vacuum tube amplifies. The source and the drain are analogous to the cathode and anode of a vacuum tube while the gate is similar to the grid. Thus, as seen, the I–V characteristics for the device are similar to those of a pentode vacuum tube. The greater the voltage swing between the source and gate, the deeper the conductive channels 36–37 and 54 become and hence the transconductance of the device is likewise increased. As earlier pointed out, particularly with respect to the energy level diagram of FIG. 2, the Fermi level 58 of the conductive channel 36 lies well above the Fermi level 26 of the drain 20 whereby current is oblique to flow from the conductive channel "down the energy hill" to the drain in the direction of the arrow 38.

Figure 8:
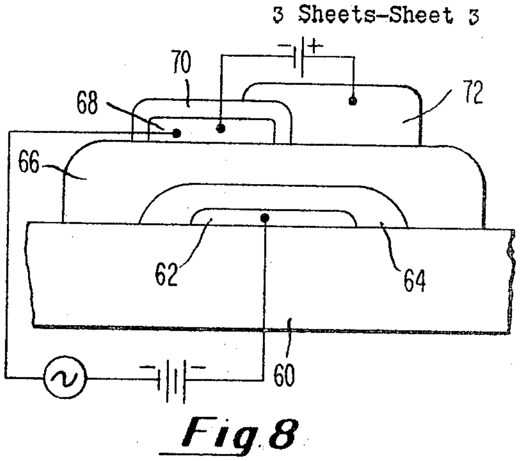

One technique for fabricating a solid state electron device in accordance with the present invention is described hereinafter with respect to apparatus seen in FIG. 8 and includes a smooth substrate 60 of glass or other similar high heat resistant material. Onto support member 60 a gate electrode 62 is deposited. A layer of silicon monoxide 64 is then layed down over the gate electrode 62 in a known manner as by evaporation. A layer 66 of cadmium sulphide is next applied over the silicon monoxide layer 64. The source electrode 68 is evaporatively deposited on the layer 66 after which an oxide insulator layer 70 is grown or evaporated as desired. Finally, the drain 72 is deposited upon the layer 66 so as to slightly overlap the source layer 68 as shown. It is at once apparent from the foregoing that the source-drain spacing problem is uniquely solved thereby. The source is now spaced from the drain by only the thickness of the oxide layer 70 a distance on the order of a few thousand angstrom units.

Figure 9:
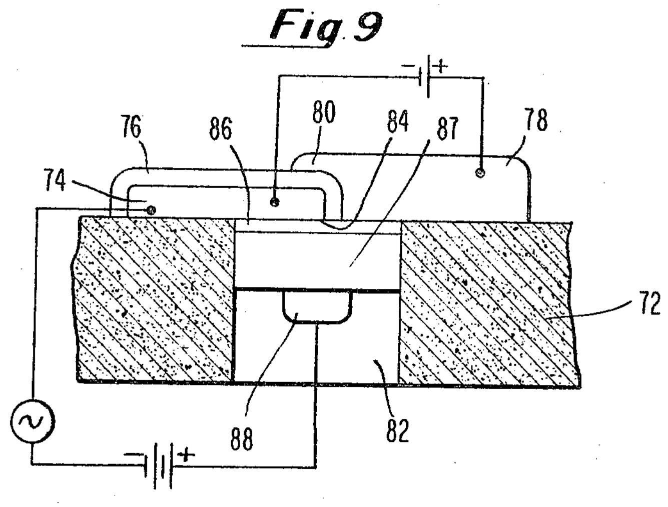

Still another and novel fabrication technique is described with respect to the structure set forth in FIG. 9. A water soluble substrate 72, e.g., a block of sodium chloride, has evaporated on one surface thereof either a metal 74 upon which can be grown an oxide layer 76 or upon which a layer of silicon monoxide can be evaporatively deposited in order to accomplish spacing between source and drain of the order of 1000 A. thick. Thus the metal 74 becomes the source while the very thin insulating layer 76 provides a separation on the order of 1000 A. thick. Thereafter, the drain electrode 78 is layed down in a manner such that it slightly overlaps the source as shown at 80 and is separated from it by only the thickness of the oxide layer 76. The soluble block 72 is now turned upside down and with water under gentle pressure, a hole 82 is etched into the exposed surface thereof adjacent the source-drain overlap 80 to expose portions of both the source and drain now separated by the thickness of the oxide material. The exposed surface 84 is then oxidized to form the tunnel insulator 86. This layer is then covered with a layer 87 of silicon monoxide after which a gate electrode 88 is attached, as by evaporation, the complete the device.

There has thus been described a novel method and article of manufacture employing the quantum mechanical tunneling effect resulting in a useful high gain amplifying, etc., device.

What is claimed is:

1. Solid state electron apparatus comprising:

(a) a support member capable of being readily dissolved by a liquid, (b) a source electrode disposed on one surface of said support member, (c) said source electrode being further provided with an oxide coating thereon, (d) a drain electrode disposed on the surface of said support member contiguous to said source electrode and slightly overlapping the same, (e) said support member having an aperture extending through from the opposite surface thereof to expose portions of said source and drain electrodes, (f) a tunnel insulating member disposed adjacent the exposed portions of said source and drain electrodes, (g) a blocking insulating layer overlying said tunnel insulating layer, and (h) a gate electrode disposed on said blocking insulator and effective when energized with a suitable electrical potential to create a conductive channel between said source and said drain for controlling electrons which are obliged to tunnel from said source through said tunnel insulator along said channel and into said drain.

2. Solid state electron apparatus comprising:

(a) a support member capable of being readily dissolved by a liquid, (b) a source electrode disposed on one surface of said support member, (c) an oxide coating layer on said source electrode, (d) a drain electrode slightly overlapping said source electrode, (e) said support member having an aperture extending through from the opposite surface thereof and terminating adjacent to said source and drain electrodes exposing portions of the latter, (f) a relatively thin tunnel insulating member disposed adjacent and in contact with said exposed portions of said source and drain electrodes, (g) a relatively thin blocking insulating layer overlying said tunnel insulating layer and in contact therewith, and (h) a gate electrode disposed in contact with said blocking insulator and effective when energized with a suitable electrical potential established between said source and said gate to create a conductive channel between said source and said drain whereby electrons are obliged to tunnel from said source into and through said tunnel insulator along said channel and back into said drain.

3. The method of fabricating a solid state electron apparatus comprising the steps of:

(a) applying a conductive layer to a support member capable of being readily dissolved in a liquid thereby providing a source electrode disposed on one surface thereof, (b) oxidizing the surface of said source electrode thereby providing an oxide coating layer on said source electrode, (c) depositing an oxidizable material layer on said oxide coating thereby providing a drain electrode slightly overlapping said source electrode, (d) applying a liquid to said support member effective to dissolve away a portion thereof providing an aperture in said support member extending through from the opposite surface thereof and terminating adjacent to said source and drain electrodes exposing portions of the latter, (e) oxidizing the exposed surfaces of the source and drain electrodes thereby providing a relatively thin tunnel insulating member adjacent and in contact with said exposed portions of said source and drain electrodes, (f) depositing a relatively thick blocking insulating layer overlying said tunnel insulating layer and in contact therewith, and (g) depositing a gate electrode disposed in contact with said blocking insulator effective when energized with a suitable electrical potential established between said source and said gate to create a conductive channel between said source and said drain whereby electrons are caused to tunnel from said source into and through said tunnel insulator along said channel and back into said drain.

4. The method of fabricating a solid state electron apparatus comprising the steps of:

(a) depositing conductive material on a support member readily dissolvable in water thus to provide a source electrode on one surface thereof;

(b) thermally oxidizing said source electrode thereby providing an oxide coating layer on said source electrode;

(c) evaporating a thermally oxidizable metal onto said oxide coating providing a drain electrode slightly overlapping said source electrode;

(d) applying a stream of water to said water soluble support member effectively dissolving away a portion thereof so as to provide an aperture in said support member extending through from the opposite surface thereof and terminating adjacent to said source and drain electrodes exposing portions of the latter to the atmosphere;

(e) oxidizing the exposed surfaces of said source and drain providing a relatively thin tunnel insulating member approximately 30 A. thick adjacent to and in contact with said exposed portions of said source and drain electrodes;

(f) evaporating a relatively thick oxide blocking insulating layer overlying said tunnel insulating layer and in contact therewith; and finally (g) evaporating a gate electrode in contact with said blocking insulating layer effective when energized with a suitable electrical potential established between said source and said gate to create a conductive channel between said source and said drain whereby electrons can be caused to tunnel from said source into and through said tunnel insulator along said channel and into said drain.

References Cited by the Examiner

UNITED STATES PATENTS

| | | |
|---|---|---|
| 2,854,611 | 9/1958 | Smith. |
| 3,056,888 | 10/1962 | Atalla. |
| 3,116,427 | 12/1963 | Giaever. |
| 3,155,886 | 11/1964 | Pankove. |
| 3,198,670 | 8/1965 | Nissim. |

OTHER REFERENCES

Weimer: The TFT—A New Thin-Film Transistor, Proc. of IEEE, June 1962, pages 1462–1469.

ROY LAKE, *Primary Examiner.*

F. D. PARIS, *Assistant Examiner.*